United States Patent [19]

Brunson

[11] Patent Number: 5,673,205
[45] Date of Patent: Sep. 30, 1997

[54] ACCESSING A VIDEO MESSAGE VIA VIDEO SNAPSHOTS

[75] Inventor: Gordon R. Brunson, Broomfield, Colo.

[73] Assignee: Lucent Technologies Inc., Murray Hill, N.J.

[21] Appl. No.: 629,112

[22] Filed: Apr. 8, 1996

[51] Int. Cl.$^6$ ........................................................ H04N 9/79
[52] U.S. Cl. .............................. 364/514 A; 348/6; 348/8; 382/9
[58] Field of Search ........................ 364/514 A; 348/6, 348/8, 15, 18, 24; 382/9; 381/77; 352/12

[56] References Cited

U.S. PATENT DOCUMENTS

| | | | |
|---|---|---|---|
| 4,028,733 | 6/1977 | Ulicki | 360/10 |
| 4,734,764 | 3/1988 | Pocock et al. | 358/86 |
| 4,766,505 | 8/1988 | Nakano et al. | 360/19.1 |
| 4,816,928 | 3/1989 | Sasaki et al. | 360/35.1 |
| 5,375,068 | 12/1994 | Palmer et al. | 364/514 |

OTHER PUBLICATIONS

P. DiLascia, *Exploit Video for Windows 1.1 with Visual C++ and Our Exclusive MFC Extensions*, Microsoft Development Library, 1995 #1 (Jan.), pp. 1–39.

*Advanced Fax Add On*, Computer Telephony, Jan. 1996, p. 93.

*ADAK's Wonder Box—Making BIR Manageable*, Computer Telephony, vol. 4, Iss. 3, Mar. 1996, p. 231.

Communique! User's Guide, Insoft® Desktop Conferencing and Workgroup Collaboration, Apr. 6, 1995, Version 4.0, pp. 9, 129–135.

Intuity™ Voice Processing Solutions, AT&T, 1994, PM-7732 (brochure).

*Primary Examiner*—Ellis B. Ramirez
*Assistant Examiner*—Thomas Peeso
*Attorney, Agent, or Firm*—David Volejnicek

[57] ABSTRACT

A multi-media messaging system (101) allows message recipients who lack full-motion video message-retrieval capability to retrieve at least some image content of video messages via video snapshots—image frames retrieved as still images. The system determines (302) the video capability of the recipient's terminal. If it is not full-motion video, the system plays back (320) only the soundtrack of the video message and monitors (400) the recipient's input for a snapshot request. Upon receipt of a snapshot request, the system captures (402–410) the image frame of the video message that corresponds in the video message to the point in the playback of the soundtrack at which the request was made and converts the frame from moving-image format to still-image format. If the recipient's terminal's video capability is slow video, the system sends (432) the converted frame to the recipient's terminal during simultaneous or interrupted playback of the soundtrack. If the capability is still image or voice-only, the system queues (434) the converted frame, and when soundtrack playback ends, the system queries (502) for the address of an image-retrieval terminal and sends (510, 522) the queued frames to that address.

20 Claims, 4 Drawing Sheets

ACCESSING A VIDEO MESSAGE VIA VIDEO SNAPSHOTS

FIELD OF THE INVENTION

This invention relates generally to multi-media messaging and specifically to video messaging.

BACKGROUND OF THE INVENTION

Multimedia messaging systems enable their users to exchange information expressed in a variety of media, e.g., sound, image, text, video, and to access this information via a variety of access terminals, e.g., telephone, faxphone, fax machine, personal computer, video workstation. An illustrative such system is disclosed in a U.S. patent application of G. R. Branson et al. entitled "Video Messaging Arrangement", Ser. No. 08/522,647, filed on Sep. 1, 1995, commonly assigned herewith. If the selected access terminal and its connection to the multimedia messaging system is capable of handling all of the media in which the accessed message is expressed, the user can access the entire message. But if the selected terminal or its connection to the multimedia messaging system is not capable of handling all of the media of the accessed message, the user either can access only some portions of the message, or must use a plurality of different access terminals to access the entire message, or information expressed in media that the not handled by the access mechanism must be converted de expressed in media that are handled by the access mechanism. Illustrative examples thereof may be found in a U.S. patent application of G. R. Brunson entitled "Message Retrieval Via Alternative Access", Ser. No. 08/588,954, filed on Jan. 19, 1996, commonly assigned herewith, and in U.S. Pat. No. 5,479,411.

Particular the accessing of video messages presents a problem. Video messages are moving images, generally composed of a rapid sequence of still-image frames, accompanied by a synchronized soundtrack and forming therewith a compound message. Accessing of a video message therefore requires an access terminal that has both sound-reproduction capability and image-display capability with a screen of sufficient-high speed of operation and resolution for displaying the moving image. While state-of-the art PCs and workstations normally possess such capabilities, their use is not yet sufficiently widespread. Also, accessing of a video image requires a connection capable of carrying data and having sufficient bandwidth to carry the moving-image data stream. While data networks, such as many LANS and WANS, have such capability, the vast majority of messaging-system subscribers have only a narrowband analog telephone line connection between their access terminal and their messaging system. Moreover, it is normally impractical—and often impossible—to convert video messages expressed in other media. The net result is that the population of messaging system users who can access video messages is small compared to the total population of messaging system users. This deprives many messaging users of the benefits of video messaging, and also retards the spread and the usefulness of video messaging.

SUMMARY OF THE INVENTION

This invention is directed to solving these and other problems and disadvantages of the prior art. According to the invention, a video message is presented to a recipient of the message as follows. Only the soundtrack of the video message is played back to the recipient. (Playing back only the soundtrack is used herein to mean playing back the soundtrack without also playing back the moving image of the video message to the recipient.) Then in response to receipt of a request from the recipient during playback of the soundtrack, an image frame of the video message is captured. The captured image frame substantially corresponds in the video message to the point in the playback of the soundtrack at which the request was made or received. The captured image frame is then conveyed to the recipient as a still image, illustratively by being transmitted to the recipient for presentation to the recipient as a still image. Hence, a message recipient need not have full motion video message-retrieval capability in order to retrieve at least some of the image information of a received video message; all that the user needs is still-image retrieval capability—for example, a printer or a fax machine. Still-image retrieval capability is relatively much more commonly available to users than full motion video message-retrieval capability, and therefore enables many more users to obtain at least some of the benefits of video messaging.

These and other advantages and features of the present invention will become more apparent from the following description of an illustrative embodiment of the invention taken together with the drawing.

DETAILED DESCRIPTION

Figure 1:
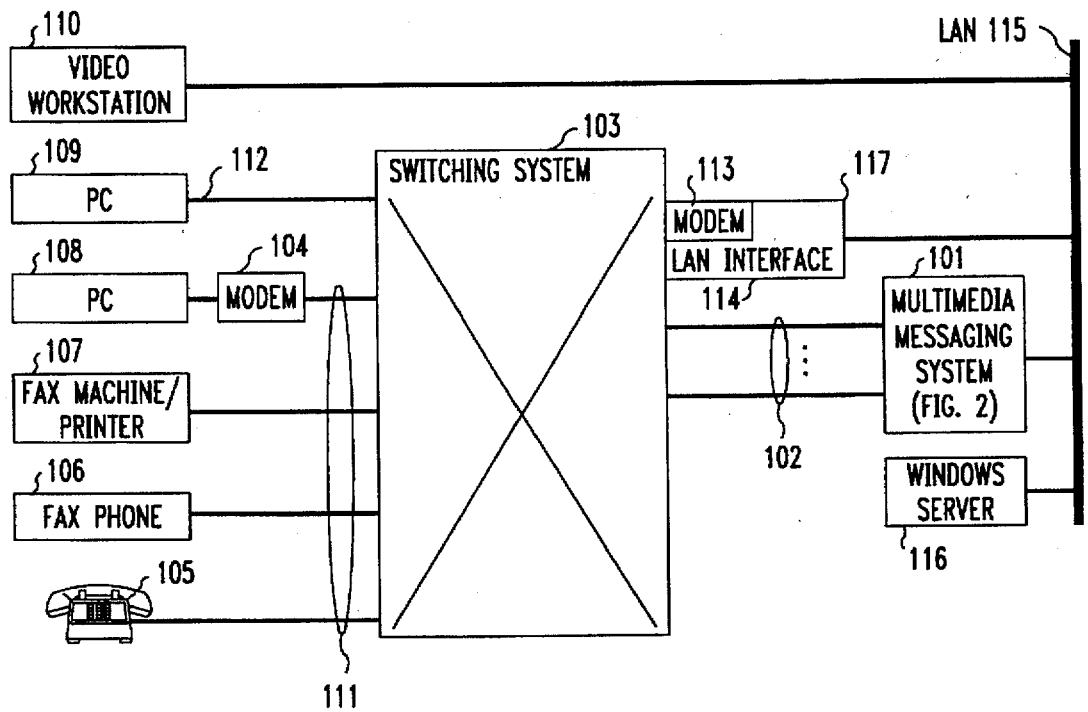
FIG. 1 is a block diagram of a telecommunications system which embodies an illustrative implementation of the invention.

FIG. 1 shows a telecommunications system that has multimedia messaging, including video messaging, capability. It includes a multimedia messaging system 101, which is illustratively a video messaging-enabled version of the Lucent Technologies Intuity® messaging system, an illustrative embodiment of which is described in the abovementioned U.S. application Ser. No. 08/522,647, which is hereby incorporated herein by reference. Messaging system 101 is connected by telephone lines 102 to a switching system 103. Switching system 103 is illustratively a public switching system such as a local central office, or a private switching system such as a Lucent Technologies Definity® private branch exchange (PBX); alternatively, switching system 103 may encompass an entire public or private telecommunications network. Switching system 103 selectively interconnects messaging system 101 with a variety of user terminals 105–109 by means of which users create and access messages in messaging system 101. User terminals 105–109 may include a standard telephone 108, a faxphone (fax-equipped telephone) 109, a fax machine or a printer 107, and a modem 104-equipped personal computer (PC) 108, all of which are connected to switching system 103 by conventional telephone lines 111. User terminals 105–109 may also include a PC 109 connected to switching system 103 by a digital telephone line 112, such as an ISDN PRI line.

Messaging system 101 is also connected to a local area network (LAN) 115 that implements a networking protocol, such as the transmission control protocol/Internet protocol (TCP/IP), and that interconnects messaging system 101 with one or more video workstations 110, illustratively as described in the abovementioned U.S. application Ser. No. 08/522,647. Switching system 103 is also connected to LAN 115, and therethrough to messaging system 101, by means of a conventional remote-access server 117. Switching system 103 connects user terminals 105–107 to messaging system 101 via telephone lines 102, but connects user terminals 108–109 to messaging system 101 via LAN 115 through server 17. PC 109 and its digital line 112 are connected to LAN 115 by a LAN interface 114 of server 117, whereas modem 104-enabled PC 108 and its conventional telephone line 111 are connected to LAN 115 through a modem 113 and an associated networking protocol, such as the Point-to-Point Protocol (PPP) or the serial line interface protocol (SLIP) which is provided by LAN interface 114. By means of these various interconnections, terminals 105–110 are able to exchange various types of messages through messaging system 101.

Conventionally, only PC 109 and video workstation 110 are fully capable of utilizing the video-messaging capability of messaging system 101. Even though PC 108 may itself have audio-reproduction and video-playback capabilities, the bandwidth of the analog connection over telephone line 111 between modems 104 and 113 is generally too low for effective, real-time, transport of moving-image data. And terminals 105–108 simply do not have video-handling (i.e., video-display) capabilities. Hence, terminals 105–108 are normally precluded from accessing video messages and from participating in video-messaging activities of the remainder of the telecommunications system of FIG. 1.

According to the invention, therefore, messaging system 101 is adapted to provide terminals 105–108 as well with access to at least some of the information content of video messages.

Figure 2:
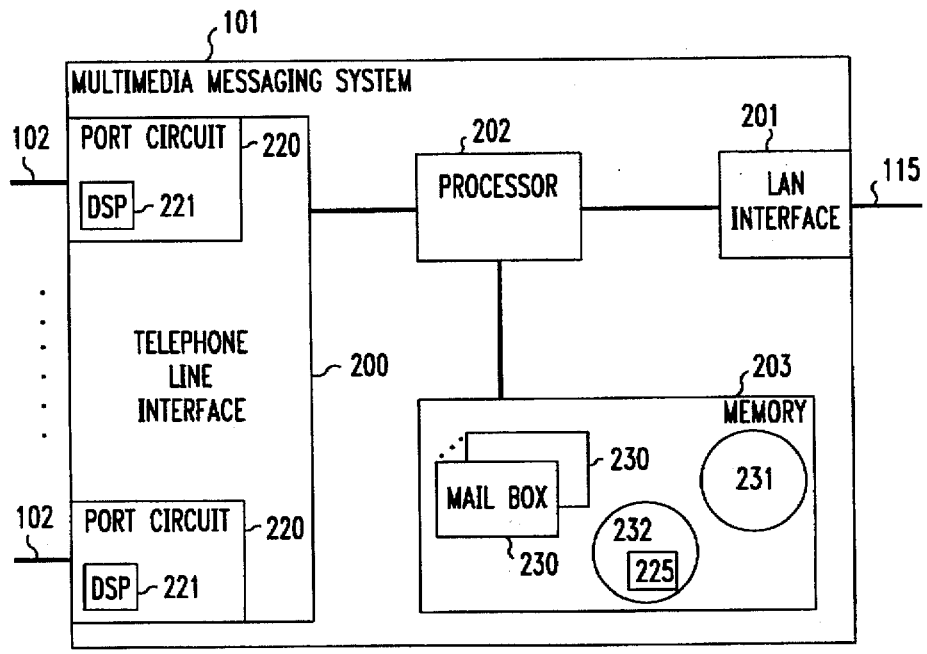
FIG. 2 is a block diagram of a multimedia messaging system of the telecommunications system of FIG. 1.

The general construction of multimedia messaging system 101 is conventional, as shown in FIG. 2. Messaging system 101 includes a telephone line interface 200 by means of which it is connected to telephone lines 102. Telephone line interface 200 includes a plurality of port circuits 220, each for connecting messaging system 101 to one or more different telephone lines 102. Each port circuit 220 includes a programmable digital signal processor (DSP) 221 for performing signal-processing functions such as control-signal recognition and generation, message-signal compression and decompression, and message-signal analog-to-digital and digital-to-analog conversion. Messaging system 101 further includes a LAN interface 201 by means of which it is connected to LAN 115. Interfaces 200 and 201 operate under control of a processor 202, and are connected by processor 202 to a memory 203 which implements users' mailboxes 230 and which stores control programs for execution by processor 202.

Figure 3:
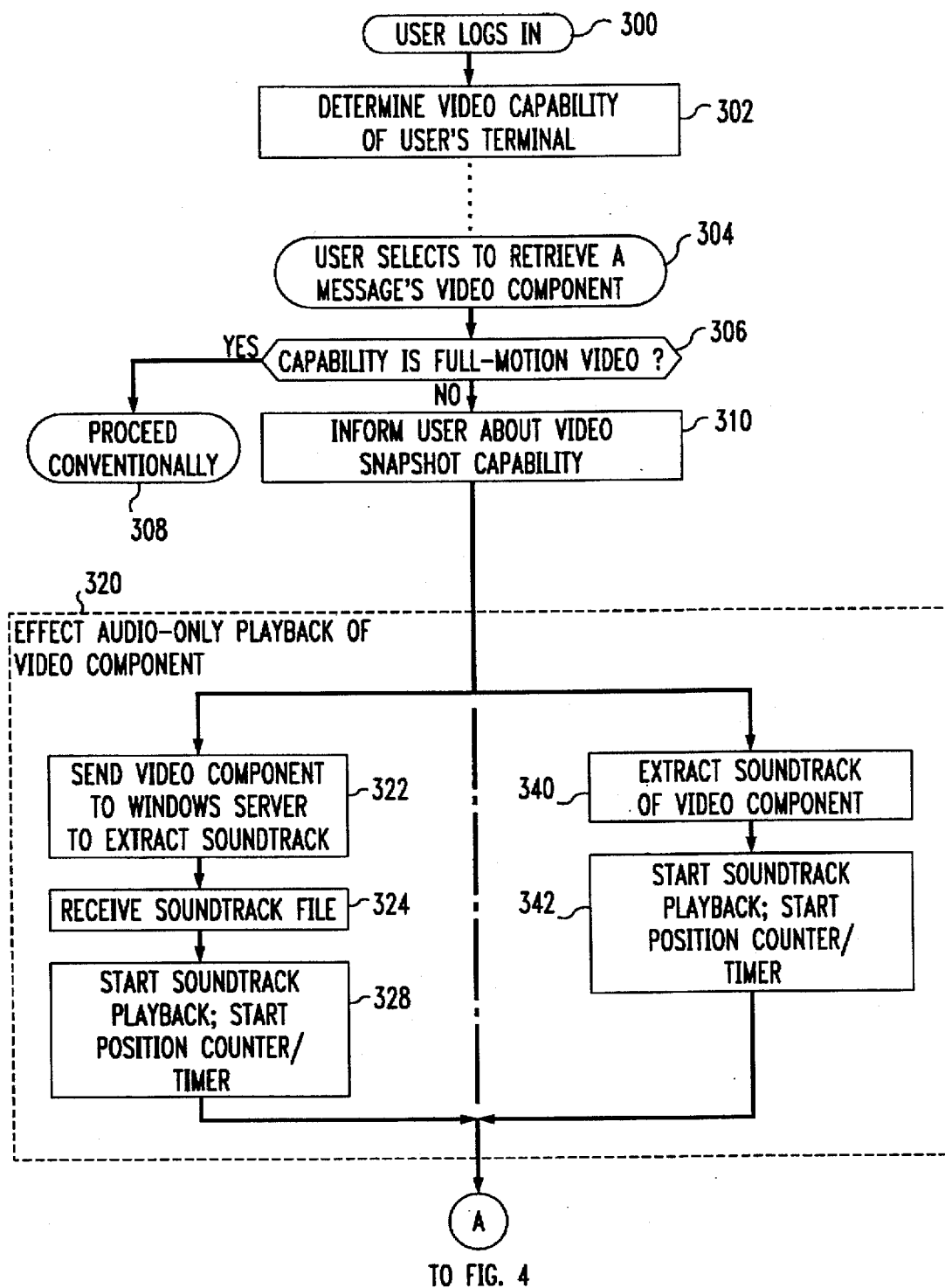
FIGS. 3–5 are a functional flow diagram of operations performed by the multimedia messaging system of FIG. 2 to effect video snapshot capability.
Figure 4:
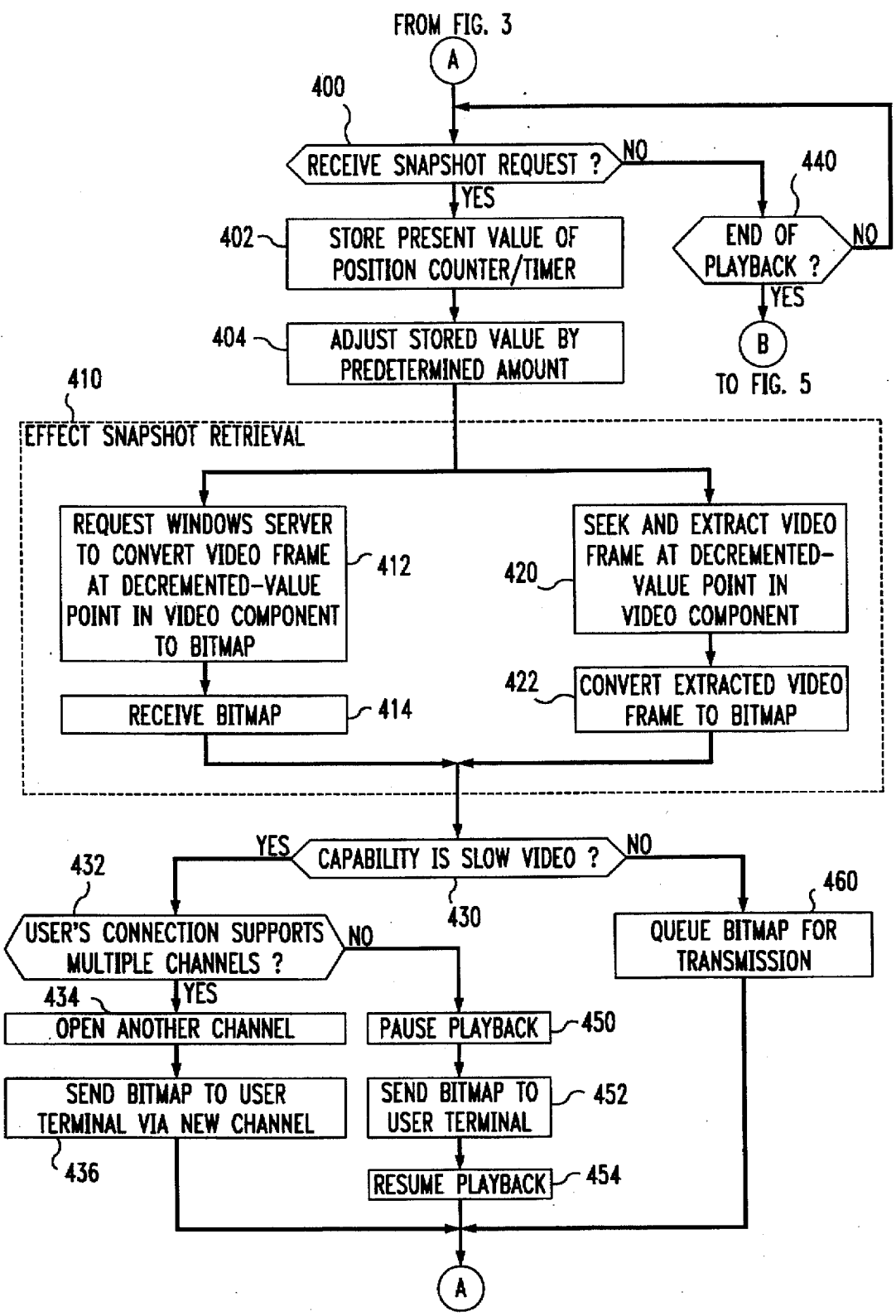
Figure 5:
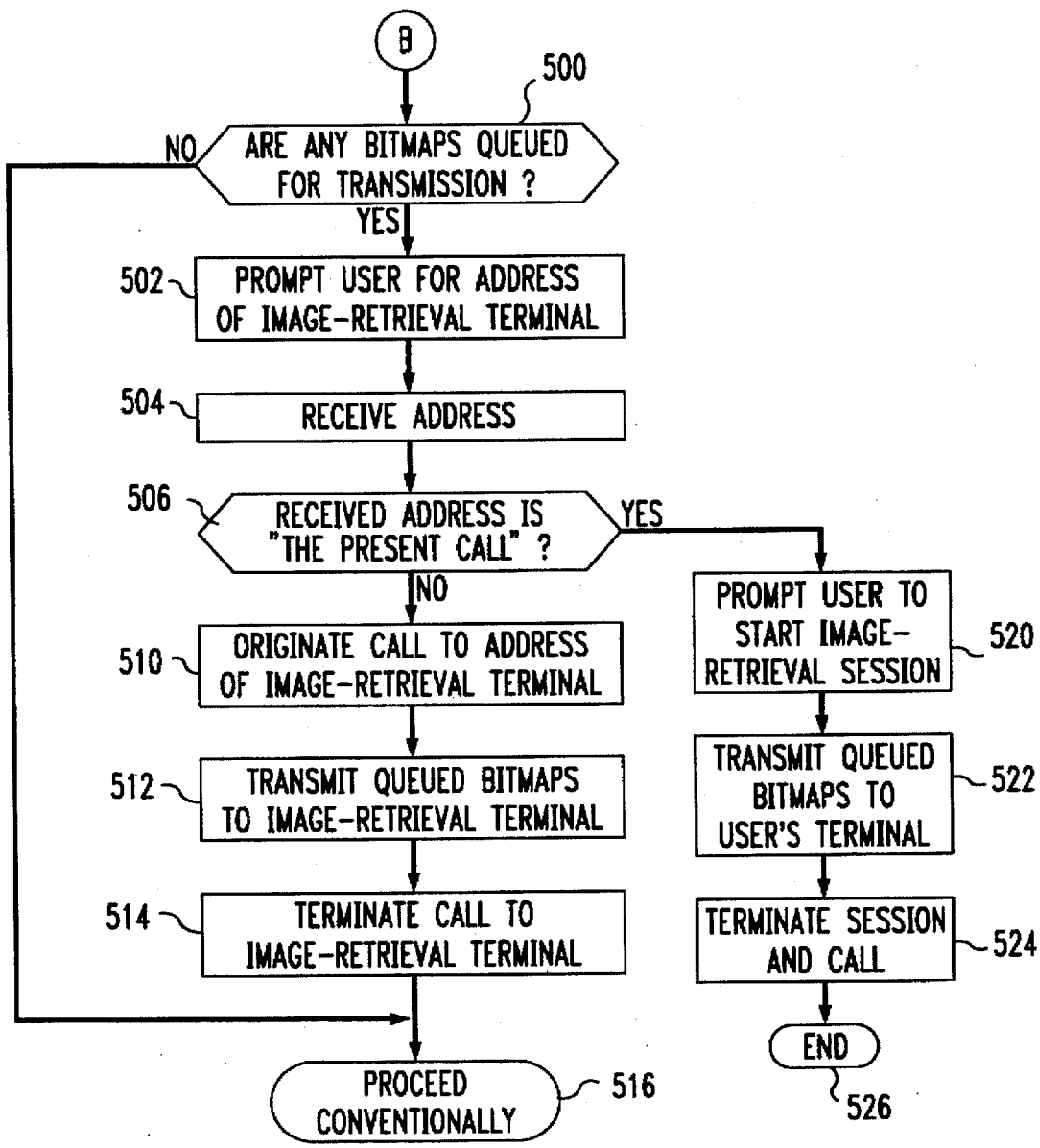

According to the invention, there are included, among the control programs of system 101, programs 231 and 232 which implement the functionality flowcharted in FIGS. 3–5. This functionality allows a message recipient who uses for message retrieval a terminal that does not have full-motion video capability to retrieve at least some of the information content of video components of messages. According to one aspect of the invention, the telecommunications system of FIG. 1 is further equipped with a Microsoft Windows® server 116—e.g., an adjunct processor that executes the Windows operating system—which is connected to messaging system 101 by LAN 115 and which supports messaging system 101 in providing the functionality flowcharted in FIGS. 3–5.

Execution of the abovementioned control program 231 is invoked when a messaging system user accesses his or her mailbox 230 and elects to retrieve either a received video message or a video component of a received message (both are alternatively referred to herein as a "video message"). The user logs into a mailbox 230 in a conventional manner, at step 300, using one of a variety of supported access instruments 105–110 (e.g., telephone, faxphone, LAN-connected PC or workstation, remote PC or workstation, etc.). The video limitations of the access instrument are automatically determined by system 101, at step 302, according to the method by which the mailbox access session is initiated. When the user elects to retrieve a video message, as determined at step 304, execution of program 231 is invoked, and program 231 checks, at step 306, whether the determined video capability of the user's terminal is full-motion video (e.g., that the terminal is a video workstation 110 or PC 109 with a digital connection 112). If so, program 231 causes messaging system 101 to play the video component to the user in a conventional manner, at step 308. But if it is determined at step 306 that the user's terminal has less than full-motion video capability and the user has elected to access a video message, program 231 causes messaging system 101 to play an announcement or to display a snapshot button to the user informing him or her of the capability of messaging system 101 to present to the user one or more selected snapshots, i.e., image frames, of the message's video component, and instructions on how the user may select the one or more snapshots during playback of the soundtrack of the video component, at step 308. Illustratively, the user is instructed to press the snapshot button (e.g., press *5 on the telephone keypad or point-and-click on the displayed snapshot button) on his or her terminal at each point in the playback of the video soundtrack for which the user wishes to see the corresponding image frame.

Program 231 then effects audio-only playback of the message's video component, at step 320. Illustratively, this function may be performed in one of two ways, depending on whether Windows server 116 is present in or absent from the system of FIG. 1.

If Windows server 116 is present, program 231 communicates with Windows server 116 by using standard Remote Procedure Call (RPC) facilities. Program 231 causes messaging system 101 to retrieve the message's video component (e.g., an "AVI" file) from the user's mailbox 230, to send the video component to Windows server 116 via LAN 115, and requests Windows server 116 to convert the video component from its present form into an audio-only soundtrack file, at step 322. Windows server 116 performs the format conversion by means of the audio/video interleaved file application programming interface (AVI file API, a part of the Microsoft Video for Windows developer kit) and associated Windows APIs, and returns the soundtrack file to messaging system 101. Upon receipt of the soundtrack file, at step 324, execution of playback driver 232 is invoked, and playback driver 232 starts sending the audio soundtrack to interface 200 for playback to the user, at step 328. Upon starting the playback at step 328, playback driver 232 also starts a position counter or timer 225 (see FIG. 1 ) that measures a time offset from the start of the played-back file, also at step 328.

If Windows server 116 is not present in the system of FIG. 1, processor 202 achieves the function of step 320 with the aid of DSP 221 of the port circuit 220 that is connected to the user's terminal and its associated channel of playback driver 232. Execution of playback driver 232 is invoked, and playback driver 232 extracts the soundtrack of the message's video component, at step 340. Playback driver 232 then starts sending the message's extracted soundtrack to DSP 221 and starts the position counter or timer 225 that measures a time offset from the start of the played-back message component, at step 342. DSP 221 starts playback of the soundtrack, also at step 342.

Playback of only the soundtrack of the message's video component having been started at step 320, playback driver 232 now monitors input from the user's terminal to determine if and when 4 the user makes a snapshot request, at step 400 of FIG. 4. Upon receipt of a snapshot request, playback driver 232 notes and stores the present value of position counter or timer 225, at step 402. Playback driver 232 then decrements the stored value by a predetermined amount that is intended to adjust—to compensate—for both the user's reaction delay time (between the playback instant for which the user wants to see the corresponding image frame and the instant at which the user generates the snapshot request) and the propagation delay between the user's terminal and playback driver 232, at step 404. Playback driver 232 passes this information to program 231.

The above discussion assumes that the actual audio playback at steps 328 and 342 is accomplished by messaging system 101 itself. Alternatively, it may be accomplished by transferring the extracted audio soundtrack file from messaging system 101 to PC 108 or 109 and effectuating audio playback from the PC by using local sound-card equipment. In this latter case, it is the messaging system's client application running on the PC (e.g., a Lucent Technologies Intuity Message Manager) that starts the playback, maintains the position counter/timer, notes the user's snapshot requests, and then requests the indicated image snapshots from messaging system 101.

When program 231 receives the playback request and adjusted value of counter or timer 225, it captures—effects retrieval of—the snapshot, i.e., the image frame, that corresponds to this decremented value, at step 410. Once again, this function illustratively may be performed in one of two ways, depending on whether Windows server 116 is present in or absent from the system of FIG. 1.

If Windows server 116 is present, program 231 requests it to extract a video frame that is offset from the beginning of the AVI file by the decremented timer/counter value, and to convert the extracted frame from the AVI file format (the moving-image format) into a bit-map format (the still-image format), at step 412. Windows server 116 performs the frame retrieval and format conversion in a conventional manner, and returns the bit-map to messaging system 101, which receives the bit-map at step 414.

If Windows server 116 is not present in the system of FIG. 1, program 231 achieves the function of step 410 with the aid of playback driver 232. Program 231 directs playback driver 232 to seek and extract a video frame that is offset from the beginning of the video component by the decremented timer/counter value, at step 420, and to convert the extracted frame from the video format (the moving-image format) into the bit-map format, at step 422. Multi-tasking ability of the playback driver 232 allows it to perform these functions while continuing the playback of the video component's soundtrack. Alternatively, if playback driver 232 does not have multi-tasking ability, playback of the soundtrack may be paused while the conversion takes place.

Having effected snapshot capture at step 410, program 231 proceeds to convey the captured snapshot to the user. Program 231 checks the determination that was made at step 302 to ascertain whether the user's terminal has slow video capability, e.g., whether the terminal is a PC 108 with an analog connection 111, at step 430. If so, program 231 checks whether the user's modem connection supports multiple simultaneous channels, at step 432. For example, if the user's modem 104 is a simultaneous voice-and-data modem (SVDM), it supports two simultaneous—voice and data—connections. But if the modem is a data-only modem or an alternate voice/data modem (AVDM), it supports only one channel at a time. If the connection does support multiple channels, program 231 causes the connection's port circuit 220 to open another channel, at step 434, and uses this channel to transmit the bit map to the user's terminal while the playback of the soundtrack continues, at step 436. If the connection does not support multiple simultaneous channels, program 231 pauses playback of the soundtrack, at step 450, long enough to transfer the bitmap to the user's terminal, at step 452, and then resumes playback of the soundtrack on the existing channel, at step 454.

Returning to step 430, if it is determined that the user's terminal does not have slow video capability (i.e., it is a still-image or no-image terminal), program 231 causes the bit-map to become stored in a queue of bit-maps to await transmission to a terminal, at step 460. Following step 436, 454, or 460, program 231 continues to monitor input from the user's terminal for another snapshot request, at step 400.

When playback of the soundtrack of the message's video component ends, as determined at step 440, program 231 checks the queue of bit-maps to determine if any bit-maps are queued for transmission, at step 500 of FIG. 5. If not, messaging system 101 continues with conventional message-retrieval activities, at step 516. If the queue does contain bit-maps, program 231 again proceeds to convey the captured snapshot to the user. Program 231 prompts the user for an address of a terminal at which the user wishes to retrieve the snapshots, at step 502. The prompted-for address may be the address of any terminal capable of presenting a bit-map still image to the user, such as a fax machine or a printer 107, for example. Upon receipt of the address from the user, program 231 checks if the received address is "the present call", at step 506. That is, program 231 checks whether the user wants to receive the bit-maps over the same connection over which the user had just received the soundtrack. If so, program 231 prompts the user to start the imageretrieval session (e.g., press "start" on a faxphone), at step 520, and causes the stored bit-maps to be transmitted from the queue to the user's terminal, at step 522. The user's terminal displays the bit-maps to the user as still images, thereby completing conveying of the snapshots to the user. Program 231 then causes messaging system 101 to terminate the session and the call at step 524. Interaction of the user and system 101 then ends, at step 526.

Returning to step 506, if it is determined that the user has not selected "the present call" as the destination for image retrieval, but has indicated another destination, program 231 causes an unused telephone line interface 200 of messaging system 101 to originate a call to the address of the image-retrieval terminal that was specified by the user at step 502, at step 510. Program 231 then causes the stored bit-maps to be transmitted from the queue to the image-retrieval terminal, at step 512. Following the transmission, program 231 causes the line interface 200 to terminate the call to the image-retrieval terminal, at step 514. The image-retrieval terminal displays the bit-maps to the user as still images, for example, by printing a paper copy thereof, and thereby completes conveying of the snapshots to the user. Messaging system 101 then continues with conventional message-retrieval activities, at step 516.

Of course, various changes and modifications to the illustrative embodiment described above will be apparent to those skilled in the art. For example, any desired video format may be used to store the video message in system 101, and any desired still-image format may be used to transmit and/or present the video snapshots to/at the user terminals. The received video snapshots may be cached (temporarily stored in memory) by the user's slow-video terminal and the user may be allowed to display the individual images at will and to move from displaying any one received image to displaying any other received image at any time. Also, the received video snapshots may be reused by the recipient for message-creation and message-forwarding. Furthermore, with respect to video messages that have multiple soundtracks (e.g., multi-lingual messages or video-conference messages), the user may be given the option of selecting which one of the soundtracks he or she wishes to have played back. Such changes and modifications can be made without departing from the spirit and the scope of the invention and without diminishing its attendant advantages. It is therefore intended that such changes and modifications be covered by the following claims.

The invention claimed is:

1. A method of presenting a video message to a recipient of the message, comprising the steps of:

playing back only a soundtrack of the video message to the recipient;

in response to receipt of a request from the recipient during playback of the soundtrack, capturing an image frame of the video message that substantially corresponds in the video message to a point in the playback of the soundtrack at which the request was made or received; and conveying the captured image frame to the recipient as a still image.

2. The method of claim 1 wherein:

the step of conveying comprises the step of transmitting the captured image frame to the recipient for presentation to the recipient as a still image.

3. The method of claim 1 wherein:

the step of conveying comprises the steps of obtaining from the message recipient a destination address for the still image; and transmitting the captured frame to the obtained destination address.

4. The method of claim 1 wherein:

the step of conveying comprises the step of transmitting the captured frame to the recipient during the playback of the soundtrack.

5. The method of claim 1 wherein:

the step of conveying comprises the steps of queuing the captured frame for transmission; and transmitting the queued captured frame to the recipient following the playback of the soundtrack.

6. The method of claim 1 wherein:

the step of conveying comprises the steps of convening the captured frame from a moving image format to a still image format; and transmitting the converted captured frame to the recipient.

7. The method of claim 6 wherein:

the still image format is a bit map.

8. The method of claim 1 wherein:

the step of capturing comprises the step of capturing the image frame that corresponds in the video message to a point in the playback of the soundtrack a predetermined amount of time removed from the point in the playback of the soundtrack at which the request was received.

9. The method of claim 1 wherein:

the step of capturing comprises the step of capturing the image frame that substantially corresponds in the video message to a point in the playback of the soundtrack at which the request was made by the recipient.

10. The method of claim 1 wherein:

the step of capturing comprises the step of capturing the image frame that corresponds in the video message to a point in the playback of the soundtrack at which the request was received adjusted for a reaction delay of the recipient in generating the request.

11. An apparatus for presenting a video message to a recipient of the message, comprising:

means for playing back only a soundtrack of the video message to the recipient;

means responsive to receipt of a request from the recipient during playback of the soundtrack, for capturing an image frame of the video message that substantially corresponds in the video message to a point in the playback of the soundtrack at which the request was made or received; and means for conveying the captured image frame to the recipient as a still image.

12. The apparatus of claim 11 wherein:

the conveying means comprise means for transmitting the captured image frame to the recipient for presentation to the recipient as a still image.

13. The apparatus of claim 11 wherein:

the conveying means comprise means for obtaining from the message recipient a destination address for the still image; and means for transmitting the captured frame to the obtained destination address.

14. The apparatus of claim 11 wherein:

the conveying means transmit the captured frame to the recipient during the playback of the soundtrack.

15. The apparatus of claim 11 wherein:

the conveying means comprise means for queuing the captured frame for transmission; and means for transmitting the queued captured frame to the recipient upon termination of the playback of the soundtrack.

16. The apparatus of claim 11 wherein:

the conveying means comprise means for convening the captured frame from a moving image format to a still image format; and means for transmitting the converted captured frame to the recipient.

17. The apparatus of claim 16 wherein:

the still image format is a bit map.

18. The apparatus of claim 11 wherein:

the capturing means comprise means for capturing the image frame that corresponds in the video message to a point in the playback of the soundtrack a predetermined amount of time removed from the point in the playback of the soundtrack at which the request was received.

19. The apparatus of claim 11 wherein:

the capturing means comprise means for capturing the image frame that substantially corresponds in the video message to a point in the playback of the soundtrack at which the request was made by the recipient.

20. The apparatus of claim 11 wherein:

the capturing means comprise means for capturing the image frame that corresponds in the video message to a point in the playback of the soundtrack at which the request was received adjusted for a reaction delay of the recipient in generating the request.

* * * * *